Figure 1:
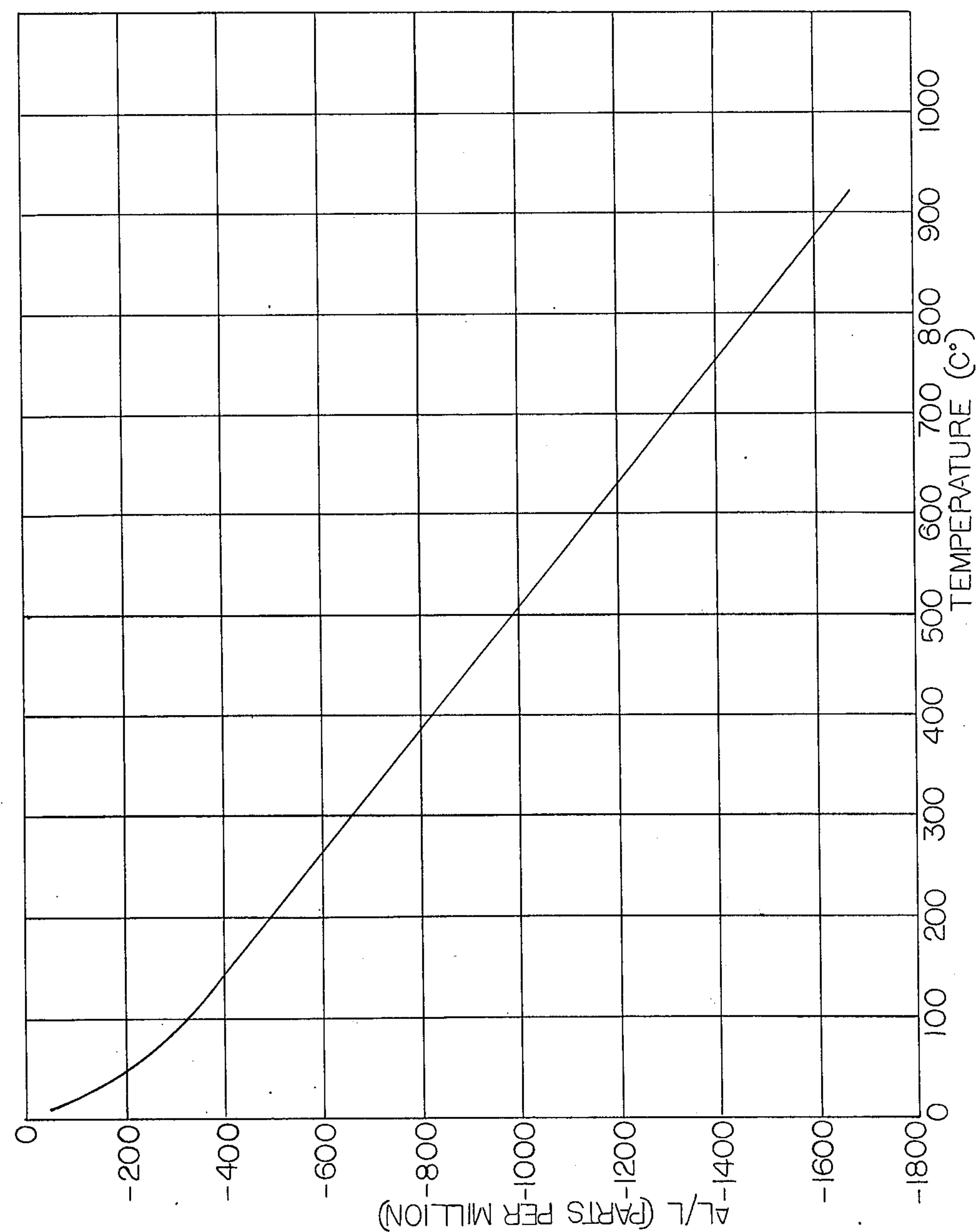

United States Patent [19]

McCollister

[11] 4,011,091

[45] Mar. 8, 1977

[54] CERAMIC MATERIALS CONTAINING KEATITE

[75] Inventor: Howard L. McCollister, Toledo, Ohio

[73] Assignee: Owens-Illinois, Inc., Toledo, Ohio

[22] Filed: Aug. 13, 1975

[21] Appl. No.: 604,509

[52] U.S. Cl. .................................... 106/39.7; 65/31

[51] Int. Cl.[2] ...................... C03C 3/22; C03C 15/00

[58] Field of Search ........................ 106/39.7; 65/31

[56] References Cited

UNITED STATES PATENTS

| | | | |
|---|---|---|---|
| 3,834,981 | 9/1974 | Grossman et al. | 106/39.7 |
| 3,841,950 | 10/1974 | Planchock et al. | 156/39.7 |

OTHER PUBLICATIONS

Keat, P., "A New Crystalline Silica", Science vol. 120, pp. 328–330 (1954).

*Primary Examiner*—Patrick P. Garvin
*Assistant Examiner*—Mark Bell
*Attorney, Agent, or Firm*—Charles S. Lynch; E. J. Holler

[57] ABSTRACT

Disclosed are low expansion, chemically resistant, ceramic articles containing keatite as the principal crystalline phase. The articles are prepared from compositions in the $Li_2O.Al_2O_3.SiO_2$ field. In preparing this ceramic article, a glass having the desired composition is formed into the appropriate shape by molding the molten glass, compaction and sintering of glass particles or by other conventional glass and ceramic forming processes. The article thus formed is then crystallized to keatite solid solution by an appropriate heat treatment followed by acid leaching in a strong but diluted aqueous acid to produce a ceramic material having the hydroxy aluminosilicate crystalline structure. The hydroxy aluminosilicate ceramic article is then thermally dehydrated to produce a ceramic article containing keatite as a crystalline phase together with mullite with or without the presence of other phases such as amorphous or glassy $SiO_2$, quartz and nucleants.

23 Claims, 3 Drawing Figures

CERAMIC MATERIALS CONTAINING KEATITE

This invention relates to ceramic materials which are useful for high temperature applications such as heat exchangers for gas turbine engines and thermal and catalytic reactors for gaseous exhausts of combustion engines.

Ceramic materials to be used for high temperature applications (e.g. 1100° C and above) must be quite low in thermal expansion in order to minimize thermal stress. These materials should also be stable against high temperature phase transformations which increase the coefficient of thermal expansion or otherwise detract from the high temperature structural integrity. Such materials should also be nonreactive with respect to their environment at high temperatures.

These properties are particularly important in heat exchange devices for automotive applications. For instance, in commonly assigned U.S. Pat. Nos. 3,807,173; 3,871,852 and 3,841,950, there are disclosed several embodiments of heat exchangers, namely recuperators and regenerators for use with gas turbine engines for various automotive vehicles, including automobiles, trucks, busses, and the like, together with a full disclosure as to how to make such heat exchangers.

In each embodiment of the disclosures, the regenerative heat exchangers comprises a matrix of integrally fused tubes forming a series of smooth longitudinal parallel passageways therethrough, wherein the walls defining the passageways are nonporous and consist essentially of an inorganic crystalline oxide ceramic material having an average coefficient of thermal expansion near zero.

In the aforementioned U.S. Pat. No. 3,871,852, there is disclosed a recuperator comprising a matrix comprising an assembly of integrally fused tubes arranged in a plurality of layers of tubes superimposed one above the other in successive parallel planes, the tubes within each plane being essentially parallel to each other and transverse to the tubes in adjacent layers, the tubes in each layer forming a series of longitudinal parallel passageways through the matrix.

In commonly assigned U.S. Pat. No. 3,807,173, there is disclosed an integral monolithic exhaust reactor for a combustion engine including a first reaction zone comprising an elongated tube for receiving the flow of hot glass effluents from a combustion engine. A matrix comprising a plurality of parallel tubes extends longitudinally of and is disposed about the first tubular reaction zone and is bonded thereto. The parallel tubes are bonded together in the matrix to form a rigid support for the elongated tube. A plurality of the matrix tubes disposed about the elongated tube have open passageways which are in communication with the elongated tube and receive the flow of gas effluents therefrom. These matrix tubes define a second reaction zone for the gas effluents and connect with outlet means to permit passage of gas therefrom.

In such automotive exhaust applications, the high temperature atmosphere resulting from fuel combustion contains reactive exhaust gases. If these gases react to change the composition of the ceramic material, rapid degradation of the ceramic structure frequently results.

In the past there has been a great deal of research effort toward the development of high temperature ceramic and glass-ceramic materials. Much of this work has been in the $Li_2O.Al_2O_3.SiO_2$ composition field. One of the limitations of $Li_2O.Al_2O_3$. $SiO_2$ material is it reactivity with hydrocarbon combustion products containing sulfuric acid and sodium which are present in gas turbine engines. This reactivity is due at least in part to the ion exchange reaction occurring between $Li^+$ ion in the glass-ceramic and $H^+$ or $Na^+$ ions in the combustion atomsphere. This reactivity detracts from the high temperature stability and thereby limits the effective service life.

The present invention overcomes the problems of the prior art by providing a ceramic material having crystalline $SiO_2$ in the form of keatite which renders the material thermally stable against significant coefficient of expansion variation and chemical stable against detrimental phase transformation in combustion gas atompshere at temperatures as high as 1100° C and above.

It is recognized that U.S. Pat. No. 3,834,981 discloses a ceramic material called "aluminous keatite" which is formed by ion exchanging hydrogen for lithium in beta spodumene containing compositions. This aluminous keatite is specifically distinguished from keatite in this patent.

The materials of the present invention have a greater high temperature phase stability in the temperature range of 1100° C to 1250° C while maintaining a lower coefficient of thermal expansion than those materials of U.S. Pat. No. 3,834,981. These improvements in performance properties can be attributed to a difference in the composition of the crystalline phase (i.e. keatite versus aluminous keatite) which is readily apparent from the X-ray diffraction data.

As used herein "keatite" refers to the crystalline phase having the X-ray diffraction data according to ASTM card 13 14 26 as shon in Table 1. Keatite forms a solid solution series in the below described lithium aluminosilicate composition range which includes $1Li_2O.1Al_2O_3.4SiO_2$ (sometimes referred to as beta spondumene). Keatite solid solution is used herein to designate any member of this series and is believed to be preferred nomenclature over the beta spodumene solid solution designation. High quartz solid solution is a metastable solid solution crystalline phase in the lithium aluminosilicate compositional field which usually trahsforms to keatite solid solution when heat treated at high temperature for prolonged time periods. These and other phases are mentioned herein and identified by X-ray diffraction data. The term $SiO_2$ (keatite) also refers to $SiO_2$ in the keatite form.

In this regard the article entitled "A New Crystalline Silica" by Paul P. Keat appearing in Science, Vol. 120, pp. 328–30 (1954) is of interest in presenting the X-ray diffraction data for keatite. The Oak Ridge National Laboratory (ORNL) report of Apr. 3, 1958 entitled "Some Aspects of the Recovery of Lithium from Spodumene" is also of interest in disclosing the acid leaching of spodumene and the X-ray diffraction data for the resulting products. This ORNL report indicates phase instability and transformation at temperatures in the neighborhood of 1100° C.

The present invention represents a marked improvement over these materials of the prior art in high temperature phase stability which results in the maintenance of consistently low coefficients of thermal expansion during prolonged service at such high temperatures.

Figure 2:
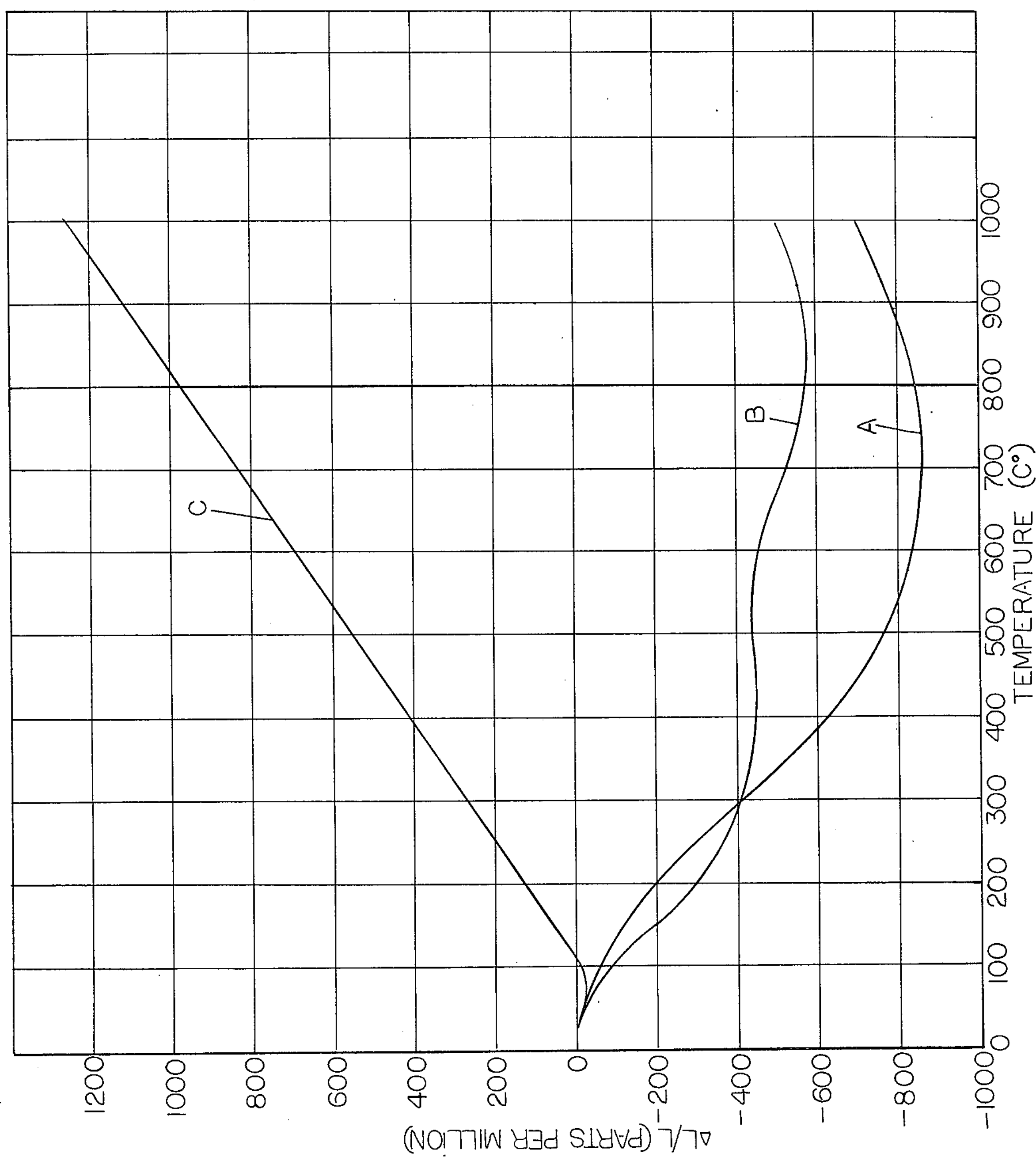
Figure 3:
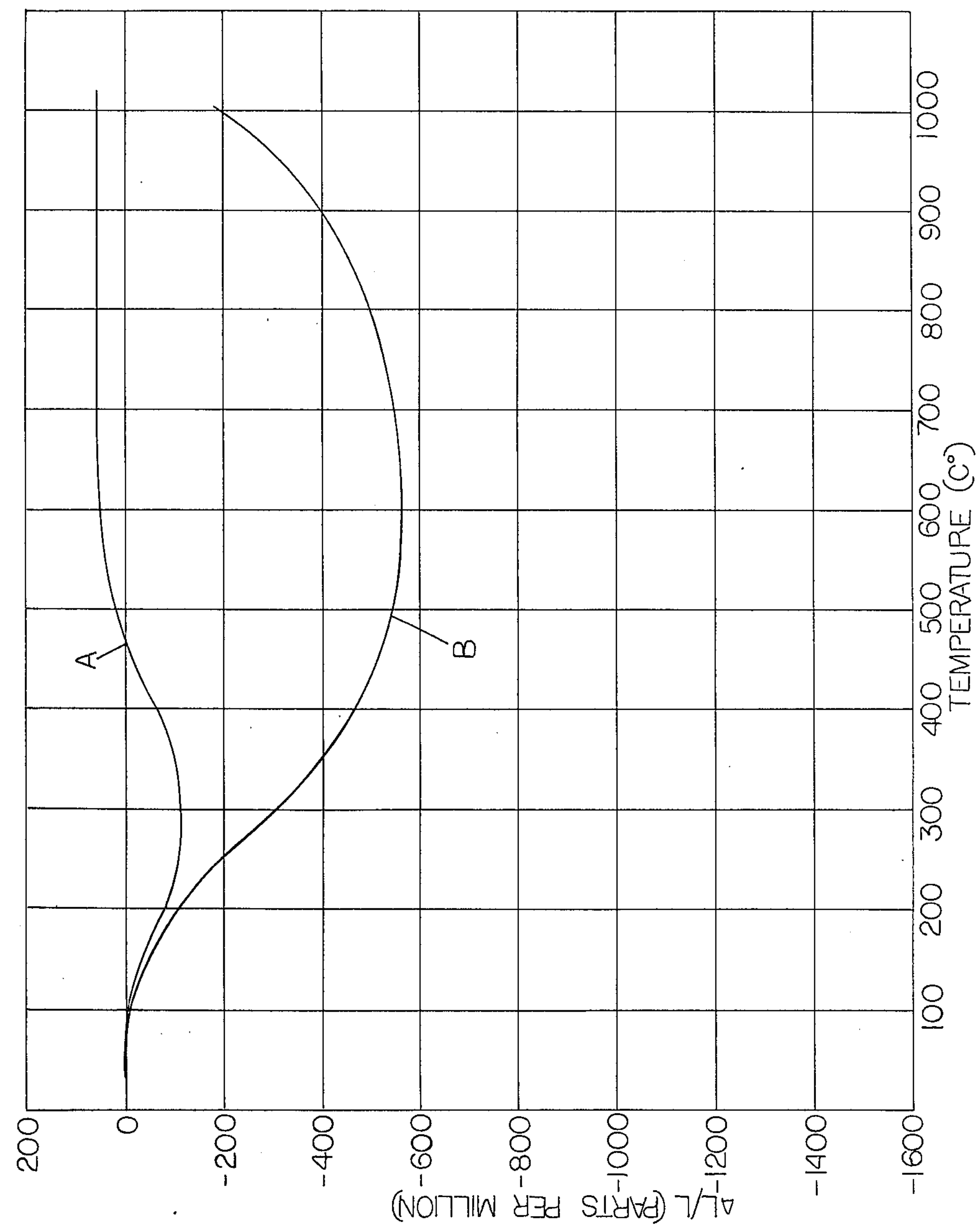

This invention will become apparent from the following description and drawings where FIGS. 1, 2 and 3 are graphs illustrating the thermal expansion characteristic of several of the exemplary compositions as a function of composition and processing conditions.

In attaining the objects of this invention, one feature resides in forming a crystalline lithium alumino-silicate ceramic article consisting essentially of:

| Component | Weight % |
|---|---|
| $SiO_2$ | 72-83 |
| $Al_2O_3$ | 11-21 |
| $Li_2O$ | 3.0-5.0 |

To assure the formation of the keatite solid solution upon crystallization and keatite in the dehydrated ceramic article the following molar proportions are employed:

When the $SiO_2/Al_2O_3$ molar ratio is from about 6 to 7.5, the $Li_2O/Al_2O_3$ molar ratio is from about 0.65 to 0.85;

When the $SiO_2/Al_2O_3$ molar ratio is from about 7.5 to 9, the $Li_2O/Al_2O_3$ molar ratio is from about 0.85 to 0.97; and When the $SiO_2/Al_2O_3$ molar ratio is from about 9 to 12, the $Li_2O/Al_2O_3$ molar ratio is from about 0.87 to about 0.97.

Compositions having these molar ratios tend to form keatite solid solutions rather than cristobalite or other undesired phases upon crystallization. Compositions of this type are disclosed in U.S. Pat. No. 3,841,950.

Preferrably composition within the above ranges consist essentially of:

| Component | Weight % |
|---|---|
| $SiO_2$ | 78.0-82.5 |
| $Al_2O_3$ | 13.5-17.0 |
| $Li_2O$ | 3.5-5.0 |

These composition ranges are important for several reasons. When the $SiO_2$ content of the lithium aluminosilicate is too low or the $Li_2O$ content is too high for the amount of $SiO_2$ present, the keatite structure tends to be unstable due to the relatively high proportion of $Li_2O$ removed from the keatite solid solution upon leaching. When the $SiO_2$ content is too high the keatite structure tends to be unstable in transforming to high expansion cristobalite.

The composition ranges specified herein are on the basis of $SiO_2$, $Al_2O_3$, and $Li_2O$ only and are free of nucleants because the molar ratios of $SiO_2$, $Al_2O_3$, and $Li_2O$ are important. For the sake of clarity, the compositions of the Examples that contain nucleants are also reported on the basis of $SiO_2$, $Al_2O_3$, and $Li_2O$ for ease of comparison to the specified ranges.

The term "consisting essentially of" in addition to the $SiO_2$, $Al_2O_3$, and $Li_2O$, includes up to about 15% by weight of other ingredients, such as nucleants, which do not detrimentally effect the performance of the overall composition. Thus the compositions of invention contain at least about 85% by weight of $SiO_2$, $Al_2O_3$ and $Li_2O$ in the weight proportions indicated above.

It is important to the practice of the present invention that the composition be free, or essentially free, of barium, calcium, zinc, magnesium and other divalent and alkaline earth components which are capable of "stuffing" or otherwise modifying the keatite solid solutionupon crystallization. If these divalent components are present they are not readily leachable from the keatite solid solution and prevent the attainment of keatite in the dehydrated ceramic product. Preferrably such divalent components are absent altogether. If they must be present due to batch impurities or other uncontrollable factors, they must be present in such small amounts that they do not participate in the crystallization (e.g. less than about 0.1% by weight of the overall composition).

The presence of minor amounts (e.g. less than 1% by weight) of monovalent and alkali metal components is not as detrimental as the divalent components because monovalent component do not usually participate in the crystallization and are removable by leaching. It is preferred, however, that the composition be free of such monovalent components. In addition, the above composition contains nucleants such as $TiO_2$, $ZrO_2$ or mixtures thereof in the range of 0.1-9% of the overall composition when glass-ceramic processing is employed. It is preferred that the combined nucleant by present in at least 3% by weight for the development of small crystals which are believed to improve the strength. More than 9% by weight of nucleant offers no particular advantage. Nucleants are not required when compaction and sintering or other forming processes besides glass-ceramic process is employed.

Refining agents such as antimony oxide, arsenic oxide or the like can be present in small proportions (e.g. up to about ½ to 1% by weight of the overall composition) if such ingredients are deemed necessary for glass refining.

The above compositions are formed in the desired shape by slip casting, compaction and sintering of particulates, glass-ceramic techniques or other conventional ceramic forming processes. The article is then heat treated to form the lithium aluminosilicate ceramic article containing keatite solid solution as the predominant crystalline phase. Heat treating at 1250°-1400° C for about ½ hour to 5 hours will usually accomplish these results with the lower temperatures requiring longer time periods. For some applications the heat treatment can be stopped short of complete formation of the keatite solid solution to form a mixture of quartz solid solution and keatite solid solution for adjusting the thermal expansion of the resulting article.

The lithium aluminosilicate crystalline article is acid leached in aqueous acid to exchange hydrogen ions for substantially all of the lithium ions (e.g. less than about 0.05% $Li_2O$ remains) in said ceramic article to form a hydroxy aluminosilicate crystalline structure. The hydroxy aluminosilicate crystalline structure is heated at a temperature and for a time sufficient to dehydrate said structure and form a thermally stable low expansion ceramic article containing crystalline $SiO_2$ in the form of keatite as the principal phase. The acid use in the leaching can be in the liquid or vapor phase as long as the acid contains sufficient water so that the resulting dehydrated ceramic article contains keatite as the principal crystalline phase. This has been empirically determined to be at least about 10% by weight of water.

Another feature of the invention resides in the dehydrated ceramic article resulting from the foregoing process which is a low expansion, thermally stable, chemically durable ceramic article having improved phase stability at a temperature of about 1100° C to 1150° C which contains crystalline $SiO_2$ keatite as the predominant crystalline phase. It is an important characteristic of these dehydrated ceramic articles that mullite is present as a crystalline phase in addition to the keatite. Mullite has the nominal formula $3Al_2O_3$.-$2SiO_2$. The formation of the mullite is necessary due to the presence of $Al_2O_3$ in the lithium aluminosilicate crystalline article.

In that the $Al_2O_3$ is not removed in the leaching process and is not present in an "aluminous keatite" phase, a separate aluminous phase, mullite, is formed.

These ceramic articles formed from the above described lithium aluminosilicate compositions consist essentially of keatite as the predominant crystalline phase together with about 15% by weight to about 32% by weight of mullite on the basis of $SiO_2$ and $Al_2O_3$ and exclusive of any nucleant phases that may be present. As will be understood, minor proportions of amorphous $SiO_2$, quartz or cristobalite can also be present in some practices of the present invention.

Yet another feature of the invention resides in the hydroxy aluminosilicate structure formed in the above described process.

As will be apparent from the description that follows, one of the primary distinctions from the prior art processes, including U.S. Pat. No. 3,834,981, is in the strength of the acid employed in the acid leaching step. The present process employs a diluted aqueous acid containing 10% or more by weight of water.

This acid leaching step can be accomplished by direct immersion of the crystalline lithium aluminosilicate ceramic article in an aqueous acid solution or by contact with the vapor phase generated by vaporizing an aqueous acid solution. This strength of the acid in this leaching step is important and results in the formation of crystalline silica in the stable keatite from rather than the aluminous keatite form in the dehydrated ceramic article.

As used herein, the term "ceramic" includes porous and nonporous, sintered and unsintered particulate oxide ceramics, cast ceramics as well as so-called glass-ceramics. In this regard, the porous ceramics (e.g. at least about 10% porosity volume) are sometimes preferred to increase the exposed surface area for contact with the leaching acid. The term "glass-ceramic" is used herein according to its conventional meaning and refers to an at least partially crystalline ceramic body which formed by the in-situ thermal crystallization of a parent glass composition.

The parent glass compositions can be melted in the normal manner in gas-fired furnaces, preferably using slightly oxidizing conditions, or in electric furnaces from normal, common batch materials.

In making the parent glass compositions, batch ingredients in the proper proportions in finely divided or powdered form are intimately admixed and then melted in a gas-fired furnace in open platinum crucibles. Melting temperatures are generally in the neighborhood of 1100° C to 1600° C.

The parent glass compositions can be crystallized in a number of ways. In one method the parent glass is simply slowly cooled after being cast, pressed, or otherwise formed into the desired shape. During the cooling, crystallization spontaneously takes place to form the glass-ceramic body. Such products can oten be further heat treated to obtain further crystallization, if desired.

On the other hand, the molten parent glass compositions can be shaped and cooled to form a glass article and then the crystallization effected by a heat treatment comprising nucleation, development and crystallization stages.

The heat treatment process for forming glass-ceramics from a parent glass usually includes a nucleation stage at substantially the temperature of the annealing point (viscosity $10^{13}$ poises) of the parent glass, a development stage at a temperature below the fiber softening point of the parent glass (preferably at a viscosity in the range of $10^8$ to $10^{12}$ poises) and a crystallization stage at a temperature preferably 150° F to 300° F above the fiber softening point of the parent glass (i.e. viscosity of $10^{7.65}$ poises).

Additional details for forming glass-ceramics are described in U.S. Pat. Nos. 3,117,881; 3,653,862; 3,497,366; 3,837,987; and 3,841,950.

The leaching or ion-exchange treatment comprises the initial step of contacting the lithium aluminosilicate ceramic article with the liquid or vapor phase of a strong mineral acid such as sulfuric, nitric, hydrochloric, phosphoric, and hydrobromic at temperatures ranging from about room temperature to the boiling point temperatures of the acid at the ambient pressure for a time sufficient to remove essentially all of the lithium. Usually aqueous solutions of these acids at atmospheric pressure have boiling points combined in both liquid and vapor phase in the range of 100° C to 400° C and time periods of about 1 hour to about 200 hours and longer are required to exchange hydrogen ions for substantially all lithium ions present in the ceramic article. The process is time and temperature dependent with lower temperatures requiring longer time periods. Preferred leaching periods are from 50 hours or less to 200 hours at temperatures ranging from about 100° C to about 300° C for articles having a low surface area to weight ratio. For articles having a high surface area to weight ratio such as the honeycomb structures of U.S. Pat. Nos. 3,841,950 and 3,871,852, leaching periods of about 1 to about 10 hours are adequate.

In this regard aqueous solutions of sulfuric acid are preferred because of their stability, relatively high boiling points and leaching efficiency.

In practicing the leaching process the diluted acid can be present in the liquid form as in aqueous solutions containing 10% to 90% by weight and preferrably at least 75% of acid or in the vapor phase as generated by vaporizing such aqueous acid solutions. In this regard it is preferred that at least a portion of the leaching process is accomplished in the vapor phase to form keatite ceramic article having optimum phase stability at temperatures in the 1100° – 1250° C temperature range. In some practices the leaching is conducted entirely in the vapor phase or initiated in the liquid phase and then completed in the vapor phase. In some instances thermal stability is improved by an alternating sequence of dehydration heat treatments and vapor phase leaching.

When the vapor form is used the concentration of acid will depend upon the vapor pressure equilibrium between the acid and the water existing at the particular temperature. Most acids have relatively low vapor pressure when compared to water, so the vapor phase generated by vaporizing an aqueous liquid solution of acid will contain a lower concentration of acid than the liquid solution. In some applications a combined liquid phase leaching and vapor phase leaching is advantageous in achieving the keatite structure.

The reasons for the unexpected advantages in using dilute acids in the leaching step is not presently understood, although it is believed to be related to the removal of the reaction products of the leaching step from the acid-ceramic phase. The buildup of these products at the leaching site may have a detrimental effect on the leached product which results in the formation of materials other than keatite upon heat treatment.

The preferred practice of the present invention in obtaining keatite having phase stability in the 1100° to 1250° C range is to complete the acid leaching process in the vapor phase generated by refluxing an aqueous solution of the acid.

After leaching, the resulting hydroxy aluminosilicate structure can be washed with water to remove residual reaction products from the leaching. The hydroxy aluminosilicate structure has a structure which is different and distinguishable from that obtained in U.S. Pat. No. 3,834,981 by X-ray diffraction data. The acid vapor leaching treatment can be given both to the hydroxy aluminosilicate articles and to articles which have been dehydrated to keatite.

In high temperature applications where a high ratio of surface area to weight is desired, the preferred starting materials are glass-ceramic compositions in the form of thin-walled glass ceramic honeycomb structures which contain keatite solid solution or a mixture of high-quartz solid solution and keatite solid solution crystals within the above described composition range.

The heat treatment for dehydration of the hydroxy aluminosilicate article can be that used in U.S. Pat. No. 3,834,981 as long as the heating is carried out for a time at a temperature to remove essentially all of the water. It has been observed that water is driven off at temperatures as low as 400° C although heat treatment in the range of 900° C to 1300° C for time periods of 1 hour to 50 hours are efficient and economical.

The affects of the various heat treatment and leaching are shown in the Examples that follow.

Vapor phase leaching for optimum high temperature phase stability is shown in Example 2 where keatite and mullite with or without nucleant phases, is formed in the dehydrated product.

Examples 3 shows the formation of keatite which is thermally transformable to amorphous or glassy $SiO_2$ when liquid phase leaching without vapor phase leaching is employed.

Examples 4 and 11 show the formation of keatite and quartz phases. The quartz formaton is primarily a function of the crystallization heat treatment rather than the leaching process.

Example 5 shows the formation of keatite rather than quartz in the composition of Example 4 by conducting the crystallization heat treatment at a longer time. No vapor phase leaching is employed.

The other Examples illustrate the importance of the predominance of keatite solid solution in the lithium aluminosilicate crystalline article as well as the predominance of keatite in the dehydrate ceramic article. The phases are listed in accordance with their relative porportions present with the highest content by first. A phase is predominant when it is present in a higher proportion than any other phase.

The principles of the present invention will be illustrated in the Examples that follow wherein all parts are parts by weight, all percentages are weight percents and all temperatures are in ° C unless stated otherwise.

EXAMPLE 1

The following batch materials:

| Ingredients | Parts by Weight |
|---|---|
| Kesil Quartz | 2932.4 |
| Iwatani Alumina | 789.0 |
| Lithium Carbonate | 231.4 |
| Antimony Trioxide (refining agent) | 15.0 |
| Zirconium silicate frit* | 1178.8 |
| *A glass frit formed by melting and fritting the following batch ingredients: | |
| $SiO_2$ | 776.2 |
| $Li_2O$ | 134.4 |
| $ZrO_2$ | 268.2 |

are melted and refined in a refractory container in an air atmosphere in an electric furnace at 1650° C for 22 hours with stirring to form a homogeneous, batch-free, seed-free molten glass.

The resulting glass has the composition:

| Component | Weight % | Weight % (nucleant free) |
|---|---|---|
| $SiO_2$ | 74.30 | 78.55 |
| $Al_2O_3$ | 15.80 | 16.66 |
| $Li_2O$ | 4.50 | 4.99 |
| $ZrO_2$ | 5.40 | |

This composition corresponds to the molar formula $1Li_2O.1Al_2O_3.8SiO_2$ with the addition of 3 mole % $Zro_2$ as a nucleant.

The glass is cooled to room temperature and pulverized to minus 325 mesh (U.S. Sieve) particle size. The glass particles are manually compacted into a cylindrical refractory mold (about ½ inch in diameter and one inch deep) with a compaction ram. The mold and its contents are heated at 1350° C for 1 hour to sinter the particles to a porous, self-supporting, integral, lithium aluminosilicate ceramic cylinder. The volume porosity is about 10–30%. The cylinder is removed from the mold and analyzed by X-ray diffraction to contain crystalline $Li_2O.Al_2O_3 . 8SiO_2$ keatite solid solution as the predominant crystalline phase together with a small amount crystalline zirconia. The X-ray diffraction data for this keatite solid solution is set forth below in Table 1.

A burner diffusion tip is formed from the ceramic cylinder by drilling several 1 mm holes in an axial direction through the cylinder.

The burner tip is then leached by immersion in an aqueous solution of sulfuric acid which contains 86% by weight of $H_2SO_4$ with the balance being water. This leaching is carried out at the boiling point at atmospheric pressure (i.e. about 235° C) for 60 hours. After this liquid immersion leaching step the burner tip is suspended in the refluxing vapors at atmospheric pressure above a boiling solution of this same sulfuric acid solution for 38 hours. The reflux temperature is about 235° C. The article is then washed with water and dried at 100° C. The article is observed by electron microscopy to contain interlocking crystals in random with a size of about one micron.

This combined liquid and vapor leaching of the burner tip forms the hydroxyaluminosilicate structure having the X-ray diffraction data (Example 1) set forth in Table 1. This data is obtained using a Monochromatized Copper K$\alpha$ radiation ($\lambda$ = 1.54178A) with an internal standard of tungsten of 99.99% purity. Table 1 also sets forth the X-ray diffraction data for the hydroxyaluminosilicate formed according to U.S. Pat. No. 3,834,981 and the distinguishing differences are readily apparent.

For example, *hkl* reflection 112 is observed to have a relative intensity of 30 while other sources listed do not report this reflection. The presence of this reflection and others indicates that hydroxyaluminosilicate of invention has a smaller crystal cell volume than those previously reported. Marked differences in *hkl* intensities are also apparent in comparing *hkl* lines 102 and 201.

Table 1 sets forth characteristic interplanar crystal *d* spacing and intensities ($I/I_1$) of this Example in comparison to the X-ray diffraction data from the prior art. The hydroxy aluminosilicate structure produced in U.S. Pat. No. 3,834,981 has a different X-ray diffraction pattern.

It is believed that the use of the compositions of the prior art together with the leaching in 36 Normal sulfuric acid results in the formation of a different phase structure and X-ray diffraction data than that of this invention. The reasons for this difference are not understood although it has been empirically established that the compositions of the invention will produce the keatite rather than aluminous keatite structure. It is this difference in structure which is responsible for the improved phase stability of the resulting dehydrated article at high temperatures.

The coefficient of thermal expansion of the burner tip in the hydroxy aluminosilicate structural form is determined over the range of temperatures from 25° C to 900° C. FIG. 1 is a plot of the coefficient of thermal expansion in parts per million per/° C. The average linear coefficient of thermal expansion of the article as calculated from FIG. 1 is about $-16 \times 10^{-7}$/° C over the temperature range of 25° to 900° C.

The linear coefficient of thermal expansion is defined as the fractional change in length over 1° C and the average linear coefficient of thermal expansion is the arithmetic average of these coefficients over a range of temperatures.

EXAMPLE 2

A porous, self-supporting lithium aluminosilicate burner tip is formed by compaction and sintering from the same composition and procedures as in Example 1. The tip is crystallized to keatite solid solution by heat treating at 1350° C for 1 hour. The tip is then acid leached by immersion in boiling 86 wt. % $H_2SO_4$ at 235° C for 60 hours to form the hydroxy aluminosilicate structure which has X-ray diffraction data similar to the hydroxy aluminosilicate formed in Example 1.

This hydroxy aluminosilicate structure is chemically analyzed to contain:

| Component | Weight % |
|---|---|
| $SiO_2$ | 80.12 |
| $Al_2O_3$ | 16.85 |
| $H_2O$ | 2.96 |

This 16.85% $Al_2O_3$ will theoretically produce about 24% by weight mullite in the finished thermally dehydrated article.

The tip is then thermally dehydrated at 900° C for 24 hours to remove essentially all the hydrogen as water. The amount of hydrogen removed as water essentially corresponds to a one for one exchange of hydrogen for all of the lithium in the lithium aluminosilicate. The burner tip is then held at 1200° C for 1 hour and then further leached for 38 hours in the acid vapor phase over a refluxing aqueous solution of 86% $H_2SO_4$ at 235° C.

The resulting tip is then treated for phase stability by holding at 1200° C for 24 hours. At the end of this 24 hour period the burner tip is observed to contain 1 to 2 micron diameter $SiO_2$ keatite crystals and acicular one-third by 1 to 2 micron, mullite crystals and which are generally needle like in configuration and are present at the grain boundaries of the keatite crystals and analyzed by X-ray diffraction to contain $SiO_2$ (Keatite), mullite, and zirconia. Data from ASTM card No. 13–26 for $SiO_2$ keatite taken from P. P. Keat's original work and "aluminous keatite" from U.S. Pat. No. 3,834,981 are shown for comparison in Table 1.

It is clear from this data that the ceramic articles of invention contain $SiO_2$ keatite rather than aluminous keatite of the prior art. The aluminous keatite has larger crystal *d* spacing due to the presence of aluminum or other cation in the crystal structure. This difference is also shown from the comparison of lattice parameters set forth after the Examples.

X-ray diffraction analysis against standards containing known amounts of mullite indicates that the amount of mullite present in burner tip of the Example is essentially the theoretical amount obtainable from the hydroxy aluminosilicate. FIG. 2, Curve a shows the thermal expansion coefficient of the dehydrated burner tip over the temperature range from 25° C to 1000° C. The average linear coefficient of thermal expansion is about $-6 \times 10^{-7}$/° C over the temperature range of 25°–1000° C.

This example shows the mullite is present in the finished dehydrated article which has low thermal expansion and good phase stability against the formation of cristobalite after prolonged high temperature exposure.

This burner tip is used in an oxygen acetylene type torch where the tip temperature is in excess of 1200° C. No deformation or degradation of the tip is observed.

EXAMPLE 3

A porous ceramic rod is formed from the same composition as Example 1. Glass particles (−325 mesh U.S. Sieve) are manually compacted into cylindrical platinum tubes (¼ inch in diameter and 3 inches long) with a compaction run. The mold and its contents are heated to 1350° C for 1.5 hours to sinter the particles into a porous rod composed essentially of keatite solid solution. The volume porosity is in the range of 10 to 30%.

The rod is immersed in a refluxing solution 86 wt. % $H_2SO_4$ at 235° C for 48 hours to form the hydroxy aluminosilicate structure. The rod is removed, washed with water and thermally dehydrated at 1200° C for 2 hours.

FIG. 2, curve B shows the coefficient of thermal expansion of the dehydrated rod over a temperature range of 25° to 1000° C. The average linear coefficient of thermal expansion is about $-5 \times 10^{-7}$/° C over the temperature range.

The rod is then maintained at 1200° C for 24 hours. At the end of this period the rod is analyzed by X-ray diffraction and found to contain amorphous or glassy $SiO_2$ together with mullite and zirconia with less than 10 weight percent of the $SiO_2$ (keatite) phase remaining. The coefficient of thermal expansion of the resulting rod is shown in FIG. 2, Curve C over the temperature range of 25° to 1000° C. The average coefficient of thermal expansion is about $+12 \times 10^{-7}$/° C over a temperature range of 25 to 1000° C. The resulting rod does not exhibit any additional phase transformation after being maintained for several days at 1100° C.

This example shows that the phase transformation at 1200° C of the $SiO_2$ (keatite) to amorphous $SiO_2$ results when the vapor phase acid leaching step is not employed. This phase assemblage is not shown in the prior art. This type of phase assemblage is useful when a slightly positive coefficient of thermal expansion is required. When transformation of keatite is not desired, the vapor phase leaching is used.

EXAMPLE 4

Batch material are melted and refined as in Example 1 to produce a glass having the composition

| Components | Weight % | Weight % (nucleant free) |
|---|---|---|
| $SiO_2$ | 79.15 | 82.10 |
| $Al_2O_3$ | 13.46 | 13.90 |
| $Li_2O$ | 3.86 | 4.00 |
| $TiO_2$ | 1.40 | |
| $ZrO_2$ | 2.16 | |

This composition corresponds to the nominal molar formula $1Li_2O \cdot 1Al_2O_3 \cdot 10SIO_2$. A porous glass rod is formed from the glass by the compaction and sintering process of Example 3 and heat treated at 1200° C for 1.5 hours to form a crystalline ceramic rod containing about 60% by weight of $SiO_2$ keatite s.s. and 40% high quartz s.s. as determined by X-ray diffraction analysis. This heat treatment at 1200° C for 1.5 hours results in the formation of $SiO_2$ keatite s.s. and high quartz s.s. If the heating were continued at this temperature or raised to a higher temperature such as 1300° C the high quartz s.s. would be converted to keatite s.s.

The rod is then leached by immersion in 86 wt. % aqueous solution of $H_2SO_4$ at 235° C for 64 hours to form the hydroxy-aluminosilicate structure. The hydroxy-aluminosilicate is then thermally dehydrated at 1200° C for 30 hours to form $SiO_2$ (keatite), $SiO_2$ (quartz), mullite and nucleant crystalline phases.

Curve A of FIG. 3 shows the thermal expansion coefficient of the dehydrated rod over the temperature range of 25° C to 1000° C. The rod has an average coefficient of thermal expansion of about $0.5 \times 10^{-7}$/° C over the temperatures.

This example demonstrates that the process of invention can be used to provide a phase assemblage comprising $SiO_2$ (quartz) and mullite phase in addition to the $SiO_2$ (keatite) phase to tailor the average coefficient of expansion of the dehydrated article to be very close to zero.

EXAMPLE 5

A rod is formed using the composition and procedures of Example 4. The rod is heat treated at 1200° C for 3.75 hours to obtain a crystalline rod containing $SiO_2$ (keatite) s.s. and a minor amount of titania/zirconia nucleant phase.

The rod is leached by immersion in a boiling solution of 86% by weight of sulfuric acid at 235° C for 60 hours to form the hydroxy-aluminosilicate structure.

The hydroxy-aluminosilicate structure is then thermally dehydrated to 1200° C for 24 hours to form $SiO_2$ (keatite) and mullite as the crystalline phases. FIG. 3, curve B shows the thermal expansion coefficient of the dehydrated rod over the temperature range from 25° C to 1000° C. The average linear coefficient of thermal expansion is about $-2 \times 10^{-7}$/° C over the temperature range.

EXAMPLE 6

Batch materials are melted and refined according to the method of Example 1 to form a homogeneous batch-free, seed-free molten glass having the composition:

| Component | Weight % | Weight % (nucleant free) |
|---|---|---|
| $SiO_2$ | 71.90 | 74.20 |
| $Al_2O_3$ | 20.34 | 20.90 |
| $Li_2O$ | 4.76 | 4.90 |
| $ZrO_2$ | 1.60 | |
| $TiO_2$ | 1.40 | |

This composition, exclusive of nucleants, has the nominal molar formula $0.8Li_2O \cdot 1Al_2O_3 \cdot 6SiO_2$. The glass is then drawn into a series of small glass tubes having a length of about 3 inches and inside diameter of 0.05 inches and an outside diameter of 0.07 inches. A honeycomb matrix comprising a plurality of such tubes longitudinally bonded together is formed to U.S. Pat. No. 3,871,852.

The resulting honeycomb structure is then heated at 1200° C for 6 hours to form a glass-ceramic honeycomb structure containing $SiO_2$ (keatite) s.s., mullite, and nucleant as the crystalline phases.

The glass-ceramic honeycomb structure is then leached by immersion in an 86% aqueous solution of refluxing sulfuric acid at 235° C for 16 hours to form the hydroxy-aluminosilicate structure.

The hydroxy aluminosilicate structure is then thermally dehydrated at 1200° C for 1 hour to yield a ceramic article having an average coefficient of thermal expansion over the range of 25° to 1000° C of $9 \times 10^{7}$/° C. This ceramic article contains $SiO_2$ keatite, mullite, together with small proportions (e.g. less than 10%) of cristobalite and nucleant phases. This cristobalite formation is probably due to the relatively low $SiO_2$ content in the initial lithium aluminosilicate composition. It is clear, however, that the $SiO_2$ (keatite) phase is formed even at these relatively low levels of $SiO_2$.

The honeycomb matrix material is used as a burner tip diffuser in an oxygen acetylene type torch where the tip temperature is in excess of 1200° C. No deformation or degradation of the tip is observed.

Table 1

| From U.S.P. 3,834,981 hydroxyaluminosilicates | | From ORNL Report | | Example 1 | | | Keatite Solid Solution Example 1 | | $SiO_2$ Keatite ASTM 13-26 | | Example 2 $SiO_2$ (Keatite) | | Aluminous Keatite from U.S.P. 3,834,981 | |
|---|---|---|---|---|---|---|---|---|---|---|---|---|---|---|
| d(A) | $\frac{I}{I_1}$ | d(A) | $\frac{I}{I_1}$ | d(A) | $\frac{I}{I_1}$ | hkl | d(A) | $\frac{I}{I_1}$ | d(A) | $\frac{I}{I_1}$ | d(A) | $\frac{I}{I_1}$ | d(A) | $\frac{I}{I_1}$ |
| | | | | | | 100 | | | 7.46 | <2 | | | | |
| | | | | 5.62 | 2 | 101 | 5.79 | 25 | 5.64 | 5 | 5.64 | 5 | 5.68 | 5 |
| | | | | | | 110 | 5.31 | <2 | 5.28 | 5 | 5.28 | 2 | | |
| 4.56 | 30 | 4.54 | 11 | 4.51 | 15 | 111 | 4.59 | 50 | 4.50 | 20 | 4.50 | 15 | 4.53 | 15 |
| | | 3.83 | 7 | 3.77 | 5 | 200 | | | | | | | | |
| 3.74 | 60 | 3.69 | 50 | 3.68 | 100 | 102 | 3.87 | 70 | 3.72 | 70 | 3.73 | 40 | 3.79 | 40 |
| 3.49 | 100 | 3.47 | 100 | 3.44 | 80 | 201 | 3.46 | 100 | 3.42 | 100 | 3.42 | 100 | 3.44 | 100 |
| | | | | 3.30 | 30 | 112 | (covered by 201) | | 3.33 | 20 | 3.33 | 25 | 3.35 | 20 |
| 3.16 | 50 | 3.15 | 36 | 3.13 | 20 | 211 | 3.15 | 50 | 3.11 | 20 | 3.10 | 15 | 3.12 | 15 |
| 2.64 | 5 | | | 2.63 | 5 | 212 | | | | | | | | |
| | | | | 2.54 | 2 | 221 | | | | | | | | |
| 2.50 | 15 | 2.49 | 7 | 2.48 | 15 | 113 | 2.623 | 7 | 2.516 | 5 | 2.518 | 5 | 2.54 | 5 |
| 2.39 | 1 | | | 2.38 | 2 | 310 | | | | | | | | |
| 2.30 | 10 | 2.31 | 6 | 2.29 | 5 | 311 | | | | | | | | |
| 2.26 | 10 | 2.26 | 5 | 2.25 | 10 | 222 | 2.285 | 15 | 2.246 | 5 | 2.245 | 5 | 2.25 | 5 |
| 2.17 | 25 | 2.17 | 13 | 2.16 | 15 | 213 | 2.241 | 15 | 2.174 | 5 | 2.173 | 5 | 2.18 | 10 |
| 2.12 | 10 | 2.11 | 5 | 2.11 | 30 | 004 | 2.259 | 2 | 2.148 | 5 | 2.151 | 2 | | |
| | | | | 2.07 | 2 | 312 | 2.099 | 10 | 2.067 | 5 | 2.067 | 5 | 2.08 | 5 |
| 2.03 | 5 | | | 2.03 | 10 | 104 | 2.163 | 5 | | | | | | |
| | | | | 1.96 | 2 | 114 | 2.078 | 5 | 1.988 | 2 | 1.992 | 1 | 2.01 | 1 |
| | | | | 1.87 | 25 | 303 | 1.923 | 25 | 1.879 | 5 | 1.874 | 5 | 1.88 | 10 |
| 1.88 | 40 | 1.90 | 13 | 1.88 | 10 | 400 | 1.875 | 30 | 1.864 | 10 | 1.860 | 10 | 1.87 | 20 |
| 1.83 | 20 | 1.88 | 21 | 1.82 | 10 | 313 | 1.863 | 30 | Omitted | | 1.818 | 10 | 1.83 | 10 |
| 1.79 | 5 | | | 1.79 | 5 | 214 | | | | | | | | |
| 1.72 | 5 | | | 1.72 | 5 | 402 | 1.731 | 5 | | | | | | |
| 1.68 | 10 | 1.69 | 5 | 1.68 | 5 | 412 | 1.687 | 5 | 1.667 | 5 | 1.665 | 2 | 1.67 | 1 |
| 1.66 | 5 | 1.66 | 4 | 1.65 | 5 | 421 | 1.648 | 7 | 1.636 | 2 | 1.632 | 2 | 1.64 | 1 |
| 1.64 | 5 | 1.65 | 5 | 1.64 | 5 | 332 | | | | | | | | |
| 1.58 | 10 | 1.58 | 4 | 1.58 | 10 | 314 | 1.636 | 7 | 1.589 | 2 | 1.587 | 2 | 1.60 | 1 |
| 1.54 | 20 | 1.57 | 3 | 1.54 | 30 | 205 | 1.626 | 7 | 1.562 | 5 | 1.560 | 5 | 1.58 | 5 |
| | | | | 1.483 | 20 | 324 | 1.530 | 7 | 1.489 | 5 | 1.489 | 5 | 1.50 | 5 |
| | | | | 1.455 | 2 | 511 | 1.451 | 5 | 1.441 | 2 | 1.440 | 5 | | |
| | | | | 1.444 | 2 | 423 | | | | | | | | |
| | | | | 1.418 | 10 | 502 | 1.423 | 7 | | | 1.410 | 5 | | |
| | | | | 1.404 | 5 | 404 | 1.442 | 5 | 1.412 | 5 | 1.413 | 2 | | |
| | | | | 1.400 | 5 | 305 | 1.465 | 10 | | | | | | |
| | | | | 1.395 | 5 | 512 | 1.398 | 10 | 1.389 | 2 | 1.386 | 2 | | |
| | | | | 1.380 | 10 | 521 | 1.376 | 7 | 1.366 | 2 | 1.363 | 5 | | |
| | | | | 1.357 | 5 | 334 | 1.392 | 5 | | | | | | |
| | | | | 1.327 | 5 | 433 | 1.342 | 5 | | | | | | |
| | | | | 1.315 | 2 | 206 | | | | | | | | |
| | | | | 1.308 | 2 | 513 | 1.321 | 2 | | | | | | |
| | | | | 1.295 | 10 | 216 | | | 1.321 | 2 | 1.321 | 5 | | |
| | | | | 1.277 | 2 | 531 | 1.273 | 2 | | | | | | |
| | | | | 1.252 | 10 | 523 | 1.263 | 5 | 1.246 | 2 | 1.244 | 2 | | |

EXAMPLES 7 -13

Ceramic rods are prepared and evaluated from the compositions listed in Table 2 by the procedures similar to those of Example 1. Unless stated otherwise, the average coefficient of thermal expansion is reported over the range of 25° to 1000° C.

Control experiment 1 illustrates the high expansion obtained when the composition of the lithium aluminosilicate contains too much $Li_2O$ (i.e. 5.47%) for the amount of $SiO_2$present (i.e. 76.00%).

Control experiment 2 illustrates that a high expansion product results when the crystallization heat treatment is insufficient to develop keatite as the predominant crystalline phase.

Most of the foregoing exemplary compositions which contain $TiO_2$ or $ZrO_2$ nucleants are given a higher crystallization heat treatment to promote crystallization of the keatite solid solution.

These examples demonstrate the present invention can reliably produce thermally stable, dehydrated ceramic articles containing keatite having an average coefficient of thermal expansion from a negative value through 0 and up to $15 \times 10^{-7}/°$ C or higher if desired.

Table 2

| Examples | 7 | | 8 |
|---|---|---|---|
| Component | | % by Weight (nucleant free) | |
| $SiO_2$ | 74.50 | 76.90 | 78.55 |
| $Al_2O_3$ | 18.10 | 18.70 | 16.66 |
| $Li_2O$ | 4.27 | 4.41 | 4.79 |
| $ZrO_2$ | 1.60 | | |
| $TiO_2$ | 1.40 | | |
| Nominal molar formula (Exclusive of nucleants) | | $0.8Li_20 . 1Al_2O_3 . 7SiO_2$ | $1Li_20 . Al_2O_3 . 8SiO_2$ |
| Processing Sequence | | | |
| Crystallization Heat Treatment °C (Hrs.) and resulting phases | | 1200 (¼) keatite s.s., mullite, nucleant | 1200 (3) keatite s.s. |
| Leach time (Hrs.) by immersion in refluxing | | 60 | 60 |

Table 2-continued

| | | |
|---|---|---|
| ... 86% $H_2SO_4$ at 235° C | | |
| Dehydration heat treatment ° C (Hrs.) | | 1200 (18) |
| Leach time (Hrs.) in the vapor phase above a refluxing solution of 86% $H_2SO_4$ at 235° C (Hrs.) | | 100 |
| Dehydration heat treatment ° C (Hrs.) | 1200 (1) | 1200 (1) |
| Phase Stability Test ° C (Hrs.) | 1200 (1) | 1250 (6) |
| Average coefficient of thermal expansion × $10^7$/° C after Phase Stability Test | −9 | −13 |
| Phases in dehydrated product after Phase Stability Test | $SiO_2$ (keatite), mullite, nucleant | $SiO_2$ (keatite), mullite |

| Examples | 9 | |
|---|---|---|
| Component | | % by Weight (nucleant free) |
| $SiO_2$ | 74.3 | 78.55 |
| $Al_2O_3$ | 15.8 | 16.66 |
| $Li_2O$ | 4.5 | 4.79 |
| $ZrO_2$ | 5.4 | |
| $TiO_2$ | | |
| Nominal molar formula (Exclusive of nucleants) | | $1Li_20 \cdot 1Al_2O_3 \cdot 8SiO_2$ |
| Processing Sequence | | |
| Crystallization heat treatment ° C (Hrs.) and resulting phases | | 1350 (1) keatite s.s. zirconia |
| Leach time (Hrs.) by immersion in refluxing 86% $H_2SO_4$ at 235° C | | 48 |
| Dehydration heat treatment ° C (Hrs.) | | |
| Leach time (Hrs.) in the vapor phase above a refluxing solution of 86% $H_2SO_4$ at 235° C (Hrs.) | | |
| Dehydration heat treatment ° C (Hrs.) | | 1200 (1) |
| Phase Stability Test ° C (Hrs.) | | 1200 (1) |
| Average coefficient of thermal expansion × $10^7$/° C after Phase Stability Test | | −5 |
| Phases in dehydrated product after Phase Stability Test | | $SiO_2$ (keatite), mullite zirconia |

| Examples | 10 | | 11 |
|---|---|---|---|
| Components | | % by Weight (nucleant free) | |
| $SiO_2$ | 78.25 | 80.75 | 79.1 |
| $Al_2O_3$ | 14.75 | 15.22 | 13.5 |
| $Li_2O$ | 3.9 | 4.03 | 3.9 |
| $ZrO_2$ | 1.6 | | 2.1 |
| $TiO_2$ | 1.4 | | 1.4 |
| Nominal molar formula (Exclusive of nucleants) | | $0.9Li_20 \cdot 1Al_2O_3 \cdot 9SiO_2$ | $1Li_20 \cdot 1Al_2O_3 \cdot 10SiO_2$ |
| Processing Sequence | | | |
| Crystallizaton heat treatment ° C (Hrs.) and resulting phases | | 1200 (¼) keatite s.s. zirconia | 1200 (1-½) keatite s.s ~60 wt.% high quartz~40 wt.% nucleant |
| Leach time (Hrs.) by immersion in refluxing 86% $H_2SO_4$ at 235° C | | 48 | 64 |
| Dehydration heat treatment ° C (Hrs.) | | | |
| Leach time (Hrs.) in the vapor phase above a refluxing solution of 86% $H_2SO_4$ at 235° C (Hrs.) | | | |
| Dehydration heat treatment ° C (Hrs.) | | 1200 (1) | 1200 (1) |
| Phase Stability Test ° C (Hrs.) | | 1200 (2) | 1200 (30) |
| Average coefficient of thermal expansion × $10^7$/° C after Phase Stability Test | | −8 | −0.5 |
| Phases in dehydrated product after Phase Stability Test | | $SiO_2$ (keatite), mullite, nucleant | $SiO_2$ (keatite), $SiO_2$ (quartz), mullite, nucleant |

| Examples | 12 | | 13 | |
|---|---|---|---|---|
| Component | | % by Weight | | (nucleant free) |
| SiO 2 | 79.1 | | 81.6 | 84.65 |
| $Al_2O_3$ | 13.5 | | 11.5 | 11.92 |

Table 2-continued

| | | | | |
|---|---|---|---|---|
| $Li_2O$ | 3.9 | | 3.3 | 3.43 |
| $ZrO_2$ | 2.1 | | 2.2 | |
| $TiO_2$ | 1.4 | | 1.4 | |
| Nominal molar formula (Exclusive of nucleants) | | $1Li_2O \cdot 1Al_2O_3 \cdot 10SiO_2$ | | $1Li_2O \cdot 1Al_2O_3 \cdot 12SiO_2$ |
| Processing Sequence | | | | |
| Crystallization heat treatment ° C (Hrs.) and resulting phases | | 1200 (3-¾) keatite s.s., nucleant | | 1200 (60) keatite s.s., nucleant cristobalite <5 wt.% |
| Leach time (Hrs.) by immersion in refluxing 86% $H_2SO_4$ at 235° C | | 60 | | 60 |
| Dehydration heat treatment ° C (Hrs.) | | | | |
| Leach time (Hrs.) in the vapor phase above a refluxing solution of 86% $H_2SO_4$ at 235° C (Hrs.) | | | | |
| Dehydration heat treatment ° C (Hrs.) | | 1200 (1) | | 1200 (1) |
| Phase Stability Test ° C (Hrs.) | | 1200 (24) | | 1200 (2) |
| Average coefficient of thermal expansion × $10^7$/° C after Phase Stability Test | | −2 | | 15 |
| Phases in dehydrated product after Phase Stability Test | | $SiO_2$ (keatite), mullite <5 wt.% cristobalite | | $SiO_2$ (keatite) <15 wt.% cristobalite |

| Examples | Control 1 | | Control 2 | |
|---|---|---|---|---|
| Component | | % by Weight (nucleant free) | | (nucleant free) |
| $SiO_2$ | 73.65 | 76.00 | 79.1 | 82.10 |
| $Al_2O_3$ | 17.94 | 18.52 | 13.5 | 13.90 |
| $Li_2O$ | 5.30 | 5.47 | 3.9 | 4.00 |
| $ZrO_2$ | 1.60 | | 2.1 | |
| $TiO_2$ | 1.40 | | 1.4 | |
| Nominal molar formula (Exclusive of nucleants) | | $1Li_2O \cdot 1Al_2O_3 \cdot 7SiO_2$ | | $1Li_2O \cdot 1Al_2O_3 \cdot 10SiO_2$ |
| Processing Sequence | | | | |
| Crystallization heat treatment ° C (Hrs.) and resulting phases | | 1100 (20) keatite, s.s., nucleant | | 1200 (¼) high quartz~70 wt.% keatite s.s.~30 wt.% |
| Leach time (Hrs.) by immersion in refluxing 86% $H_2SO_4$ at 235° C | | 60 | | 48 |
| Dehydration heat treatment ° C (Hrs.) | | 1050 (2) | | |
| Leach time (Hrs.) in the vapor phase above a refluxing solution of 86% $H_2SO_4$ at 235° C (Hrs.) | | | | |
| Dehydration heat treatment ° C (Hrs.) | | | | 1200 (1) |
| Phase Stability Test ° C (Hrs.) | | | | 1200 (2) |
| Average coefficient of thermal expansion × $10^7$/° C after Phase Stability Test | | 96 (25 to 500° C) | | 58 (25 to 500°C) |
| Phases in dehydrated product after Phase Stability Test | | $SiO_2$ (quartz) ~ 70 wt. %, $SiO_2$ (keatite) ~ 30 wt. %, nucleant, mullite | | $SiO_2$ (quartz), $SiO_2$ (keatite), mullite, nucleant |

The X-ray diffraction data for the dehydrated ceramic product from Example 11 is set forth below.

| $SiO_2$ (quartz) d(A) | hkl | $SiO_2$ (Keatite) d(A) | hkl |
|---|---|---|---|
| | | 5.64 | 101 |
| | | 4.51 | 111 |
| 4.27 | 100 | | |
| | | 3.73 | 102 |
| | | 3.42 | 201 |
| 3.34 | 101 | | |
| | | 3.11 | 211 |
| | | 2.519 | 113 |
| 2.462 | 110 | | |
| 2.284 | 102 | | |
| | | 2.245 | 222 |
| | | 2.174 | 213 |
| | | 2.151 | 004 |
| 2.129 | 200 | | |
| | | 2.069 | 312 |
| | | 1.990 | 114 |
| 1.980 | 201 | | |
| | | 1.876 | 303 |
| | | 1.861 | 400 |
| 1.820 | 112 | | |

-continued

| $SiO_2$ (quartz) d(A) | hkl | $SiO_2$ (Keatite) d(A) | hkl |
|---|---|---|---|
| 1.671 | 202 | | |
| | | 1.634 | 421 |
| | | 1.562 | 205 |
| | | 1.489 | 324 |
| | | 1.440 | 511 |
| | | 1.408 | 502 |
| | | 1.393 | 512 |
| 1.376 | 203 | 1.363 | 521 |
| | | 1.321 | 216 |
| | | 1.245 | 523 |

To further develop and verify the distinctions in cr tal structure between the keatite material of inventi and the aluminous keatite of the prior art, the latt parameter *a*, *b*, and *c* are calculated by the follow technique.

Using Bragg's law and the X-ray diffraction 2 $\theta$ valı for the *hkl* data listed in Table 1, the crystal latt parameters *a*, *b*, and *c* are calculated with a LCR-2, Fortram Lattice Constant Refinement Program by Donald E. Williams published in the United States Atomic Energy Commission Research and Development Report IS-1052, November, 1964.

Using this computer program the following data is obtained for the dehydrated ceramic product of invention:

| | a,b | c | crystalline cell volume A⁽³⁾ |
|---|---|---|---|
| Example 2 | 7.4469 | 8.6128 | |
| Example 4 | 7.4495 | 8.6133 | |
| Example 8 | 7.4517 | 8.6083 | |
| average | 7.4494 | 8.6115 | 477.9 |
| | ±.0025 | ±.0030 | |
| ASTM Standard Card 1326 (Keatite) | 7.4621 | 8.6016 | 478.9 |
| Aluminous keatite from Patent 3,834,981 | 7.4728 | 8.7012 | 485.9 |

For the purpose of comparison, crystallization cell volumes in keatite solid solution formed from lithium aluminosilicates compositions having the nominal molar formula series are calculated in the same manner and are set forth below.

| Nominal formula | Crystalline cell volume $A^3$ |
|---|---|
| $1Li_20 . 1Al_2O_3 . 4SiO_2$ | 519.8 $A^3$ |
| $1Li_20 . 1Al_2O_3 . 6SiO_2$ | 512.3 $A^3$ |
| $1Li_20 . 1Al_2O_3 . 8SiO_2$ | 507.7 $A^3$ |

Thus, it is apparent that crystalline cell volume increases with increasing proportions of $Li_2O$ and $A1_2O_3$ and this fact accounts for the difference in crystalline cell volume between the keatite material of invention and the aluminous keatite of the prior art.

For convenience in disclosure, all patents and publications mentioned herein are incorporated by reference.

Having thus Described the Invention, What is Claimed is:

1. In the process for forming a ceramic article wherein a lithium aluminosilicate crystalline article containing keatite solid solution as the predominant crystalline phase is leached in an aqueous acid to exchange hydrogen ions for lithium ions and form a hydroxy aluminosilicate structure, and said hydroxy aluminosilicate structure is heated at a temperature and for a time sufficient to remove water from structure and form a dehydrated ceramic article, the improvement wherein said lithium aluminosilicate ceramic article consists essentially of:

| Component | Weight % |
|---|---|
| $SiO_2$ | 72–83 |
| $Al_2O_3$ | 11–21 |
| $Li_2O$ | 3.0–5.0 |

When the $SiO_2/Al_2O_3$ molar ratio is from about 6 to 7.5, the $Li_2O/Al_2O_3$ molar ratio is from about 0.65 to 0.85;

When the $SiO_2/Al_2O_3$ molar ratio is from about 7.5 to 9, the $Li_2O/Al_2O_3$ molar ratio is from about 0.85 to 0.97; and When the $SiO_2/Al_2O_3$ molar ratio is from about 9 to 12, the $Li_2O/Al_2O_3$ molar ratio is from about 0.87 to about 0.97 and said leaching is performed in a sufficiently diluted aqueous acid to form a dehydrated ceramic article containing keatite as the predominant crystalline phase together with mullite, said dehydrated ceramic article having improved phase stability and improved maintenance of low expansion characteristic at temperatures in excess of 1100° C.

2. The process of claim 1 wherein said aqueous acid is sulfuric acid.

3. The process of claim 1 wherein at least a portion of said leaching is performed in a vapor phase generated by vaporizing said aqueous acid.

4. The process of claim wherein at least a portion of said acid leaching is accomplished by immersing said lithium aluminosilicate article in an aqueous solution of said acid.

5. The process of claim 1 wherein said dehydrated ceramic article is further leached with aqueous acid in the vapor phase.

6. The process of claim 1 wherein said lithium aluminosilicate ceramic article consists essentially of:

| Component | Weight % |
|---|---|
| $SiO_2$ | 78.0–82.5 |
| $Al_2O_3$ | 13.5–17.0 |
| $Li_2O$ | 3.5–5.0 |

7. The process of claim 2 wherein said aqueous sulfuric acid contains 75% to 90% by weight of $H_2SO_4$.

8. The process of claim 1 wherein said lithium aluminosilicate article has been formed by compaction of particulates and sintering.

9. The process of claim 1 wherein said lithium aluminosilicate article is a glass-ceramic article.

10. The process of claim 1 wherein said leaching is carried out at a temperature in the range of 100° C to about 400° C.

11. The process of claim 9 wherein said leaching is carried out at a temperature in the range of 100° C to about 300° C.

12. The process of claim 1 wherein said leaching is carried out for a time period ranging from about 1 hour to about 200 hours.

13. The process of claim 1 wherein said lithium aluminosilicate crystalline article further contains high quartz solid solution as a crystalline phase in addition to said keatite solid solution and said dehydrated ceramic article contains quartz as a crystalline phase in addition to said keatite.

14. The process of claim 1 wherein said ceramic article further contains zirconia as a crystalline phase.

15. The process of claim 1 wherein said ceramic article is heat treated to produce amorphous $SiO_2$.

16. A low expansion, thermally stable ceramic article consisting essentially of keatite as the predominant crystalline phase together with about 15% by weight to about 32% by weight of mullite on the basis of $SiO_2$ and $Al_2O_3$, said ceramic article having improved phase stability and improved maintenance of low thermal expansion characteristics at temperatures in excerss of 1100° C.

17. The low expansion, thermally stable, ceramic article consisting essentially of keatite as the predominant crystalline phase together with about 15% by weight to about 32% by weight of mullite on the basis of $SiO_2$ and $Al_2O_3$, which article has been formed by the acid leaching of a lithium aluminosilicate crystalline article consisting essentially of:

| Component | Weight % |
|---|---|
| $SiO_2$ | 72–83 |
| $Al_2O_3$ | 11–21 |
| $Li_2O$ | 3.0–5.0 |

When the $SiO_2/Al_2O_3$ molar ratio is from about 6 to 7.5, the $Li_2O/Al_2O_3$ molar ratio is from about 0.65 to 0.85;

When the $Sio_2/Al_2O_3$ molar ratio is from about 7.5 to 9, the $Li_2O/Al_2O_3$ molar ratio is from about 0.85 to 0.97; and When the $SiO_2/Al_2O_3$ molar ratio is from 9 to 12, the $LiO_2/Al_2O_3$ molar ratio is from about 0.87 to about 0.97; and containing keatite solid solution as the predominant crystalline phase to produce an hydroxy aluminosilicate structure, and dehydrating said hydroxy aluminosilicate structure to form said ceramic article.

18. The ceramic article of claim 16 which further contains quartz as a crystalline phase.

19. The ceramic article of claim 16 which further contains amorphous $SiO_2$ as a relatively high expansion phase for increasing the coefficient of thermal expansion of said ceramic article.

20. The ceramic article of claim 16 which further contains zirconia as a crystalline phase.

21. The ceramic article of claim 17 formed from a lithium aluminosilicate crystalline article having a composition consisting essentially of:

| Component | Weight % |
|---|---|
| $SiO_2$ | 78.0–82.5 |
| $Al_2O_3$ | 13.5–17.0 |
| $Li_2O$ | 3.5–5.0 |

22. In a hydroxy aluminosilicate ceramic structure having been formed by the acid leaching of a lithium aluminosilicate crystalline article containing keatite solid solution as the predominant crystalline phase the improvement wherein said hydroxy aluminosilicate has a structure indicated by the following X-ray diffraction data:

| d(A) | $I/I_1$ | hkl | d(A) | $I/I_1$ | hkl | d(A) | $I/I_1$ | hkl |
|---|---|---|---|---|---|---|---|---|
| | | 100 | 2.11 | 30 | 004 | 1.444 | 2 | 423 |
| 5.62 | 2 | 101 | 2.07 | 2 | 312 | 1.418 | 10 | 502 |
| | | 110 | 2.03 | 10 | 104 | 1.404 | 5 | 404 |
| 4.51 | 15 | 111 | 1.96 | 2 | 114 | 1.400 | 5 | 305 |
| 3.77 | 5 | 200 | 1.87 | 25 | 303 | 1.395 | 5 | 512 |
| 3.68 | 100 | 102 | 1.88 | 10 | 400 | 10 | 10 | 521 |
| 3.44 | 80 | 201 | 1.82 | 10 | 313 | 1.357 | 5 | 334 |
| 3.30 | 30 | 112 | 1.79 | 5 | 214 | 1.327 | 5 | 433 |
| 3.13 | 20 | 211 | 1.72 | 5 | 402 | 1.315 | 2 | 206 |
| 2.63 | 5 | 212 | 1.68 | 5 | 412 | 1.308 | 2 | 513 |
| 2.54 | 2 | 221 | 1.65 | 5 | 421 | 1.295 | 10 | 216 |
| 2.48 | 15 | 113 | 1.64 | 5 | 332 | 1.277 | 2 | 531 |
| 2.38 | 2 | 310 | 1.58 | 10 | 314 | 1.252 | 10 | 523 |
| 2.29 | 5 | 311 | 1.54 | 30 | 205 | | | |
| 2.25 | 10 | 222 | 1.483 | 20 | 324 | | | |
| 2.16 | 15 | 213 | 1.455 | 2 | 511 | | | |

23. The hydroxy aluminosilicate ceramic structure of claim 22 formed from a lithium aluminosilicate crystalline article having a composition consisting essentially of:

| Component | Weight % |
|---|---|
| $SiO_2$ | 72–83 |
| $Al_2O_3$ | 11–21 |
| $Li_2O$ | 3.0–5.0 |

When the $SiO_2/Al_2O_3$ molar ratio is from about 6 to 7.5, the $Li_2O/Al_2O_3$ molar ratio is from about 0.65 to 0.85;

When the $SiO_2/Al_2O_3$ molar ratio is from about 7.5 to 9, the $Li_2O/Al_2O_3$ molar ratio is from about 0.85 to 0.97; and When the $SiO_2/Al_2O_3$ molar ratio is from about 9 to 12, the $Li_2O/Al_2O_3$ molar ratio is from about 0.87 to about 0.97.

* * * * *

UNITED STATES PATENT AND TRADEMARK OFFICE

CERTIFICATE OF CORRECTION

PATENT NO. : 4,011,091

DATED : March 8, 1977

INVENTOR(S) : Howard L. McCollister

It is certified that error appears in the above-identified patent and that said Letters Patent are hereby corrected as shown below:

Col. 2, line 15, "chemical" should be --chemically--.
Col. 4, line 24, "by" should be --be--.

Col. 5, line 7, "3Al2O$_3$" should be --$3Al_2O_3$--.
Table 2, Example 8, line 12, "$Al_2O_3$" should be --$1Al_2O_3$--.
Claim 22, line 10, second heading, "$I/I_7$" should be -- $\frac{I}{I_1}$ --.

Claim 22, line 16, under heading d(A), "10" should be --1.380--.

Signed and Sealed this

*Fifteenth* Day of *August 1978*

[SEAL]

*Attest:*

RUTH C. MASON
*Attesting Officer*

DONALD W. BANNER
*Commissioner of Patents and Trademarks*